Figure 1:
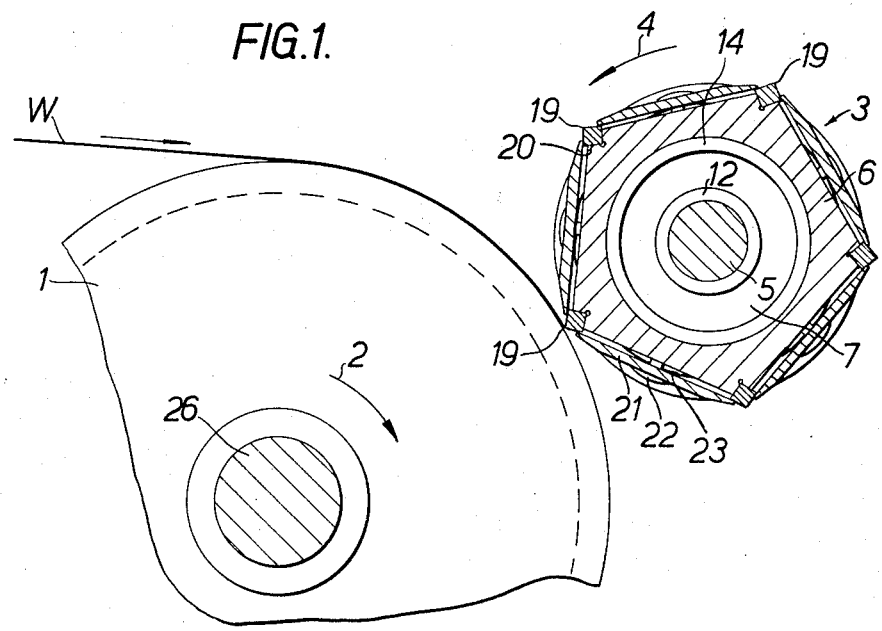

Oct. 5, 1965   E. S. DOERMAN   3,209,633
CUTTING APPARATUS
Filed Oct. 7, 1963

INVENTOR
Eryk S. Doerman

By Watson, Cole, Grindle & Watson
ATTORNEYS 3,209,633
CUTTING APPARATUS
Eryk Stefan Doerman, Deptford, London, England, assignor to The Molins Organisation Limited, a British company
Filed Oct. 7, 1963, Ser. No. 314,448
Claims priority, application Great Britain, Oct. 15, 1962, 38,924/62
7 Claims. (Cl. 83—346)

This invention concerns improvements in or relating to cutting apparatus for severing relatively small strips from a continuous web of material, and, more particularly, for cutting strips of material for use in a continuous rod cigarette-making machine.

Small strips of material, such for instance as small pieces of cork, imitation cork or other similar material, for use in uniting a mouthpiece portion to a cigarette portion in a continuous rod cigarette-making machine, can be severed from a continuous web by a knife edge acting in conjunction with a hard unyielding surface. Clean cutting without ragged edges can be achieved by feeding the web over a cylinder, to the surface of which the web is held by suction, and by causing the knife edge to enter into intimate contact with the peripheral surface of the cylinder. By causing the knife edge to rotate with an arc of rotation that interferes with the peripheral surface of the cylinder and by mounting it so that it is yielding, sufficient pressure between the knife edge and the cylinder can be generated to sever the web. However for the cut to be clean the knife edge should be aligned with the surface of the cylinder.

According to the present invention there is provided web cutting apparatus comprising a cutting member having a cutting edge, a rotatable carrier to which the cutting member is rigidly fixed, a carrier shaft on which the carrier is mounted and a web-carrying drum substantially parallel to the carrier shaft, against which the cutting edge is capable of exerting sufficient pressure to cut a web (e.g. a web of material for uniting mouthpiece portions to cigarette lengths), a degree of freedom of movement existing between the carrier and the carrier shaft so that the cutting edge is alignable with the drum and a further degree of freedom of movement existing between the drum and the carrier shaft so that sufficient pressure is capable of being applied between the cutting edge and the drum.

The degree of freedom of movement may be rotary movement about an axis transverse to the axis of the carrier shaft while the further degree of freedom may be movement between the drum and the carrier shaft along a line transverse to their axes.

A diaphragm may connect the carrier and the carrier drum. Its circumference nearer the carrier shaft may be clamped between a flange and a locking nut both of which are integral with the carrier shaft, while the outer circumference may also be clamped between an inner flange of the carrier and a locking sleeve. Both circumferences may be in contact with spacing rings. The spacing rings in contact with the outer circumference may limit the rotary movement of the carrier about an axis transverse to the axis of the carrier shaft by abutting either the inner flange or the locking sleeve.

The carrier shaft may be housed in eccentrically mounted bearings so that the distance between the axes of the drum and the carrier shaft is variable by rotating the bearings.

Further according to the invention there may be provided a rotatable cutting member having a cutting edge, a rotatable drum in which the cutting member is rigidly mounted, a countersurface against which the cutting member cuts, a shaft about which the drum rotates and a diaphragm connecting the drum to the shaft, the diaphragm being capable of flexing so as to permit the drum to rotate about an axis transverse to that of the shaft whereby the cutting edge is aligned with the countersurface. The diaphragm may be connected to the drum between two pairs of clamping rings, the outer pair of which is capable of abutting projections so as to limit rotary movement of the drum about an axis transverse to that of the shaft.

Figure 2:
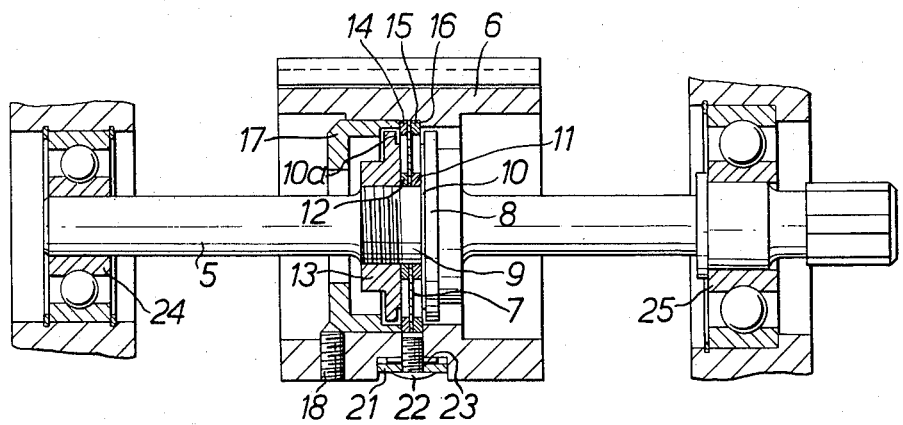

Apparatus in accordance with the invention will now be described by way of example with reference to the accompanying drawings in which:

FIGURE 1 is a section through web cutting apparatus,
FIGURE 2 is a transverse section through a knife holder and shaft shown in FIGURE 1.

In FIGURE 1, a web of material W is fed over a cylinder 1 having suction openings on its peripheral surface for holding the web W. The cylinder 1 rotates in the direction shown by the arrow 2. A knife assembly shown generally as 3 rotates in the opposite direction as indicated by the arrow 4. The assembly 3 comprises a knife carrier shaft 5, a knife carrier 6 and a flexible diaphragm or disc 7 by which the carrier 6 is attached to the shaft 5. The shaft 5 has a flange 8 and a stepped portion 9.

The side of the flange 8 immediately adjacent to the stepped portion 9 is relieved approximately .004" on its face at 10. Spacing rings 11 and 12 fit over the stepped portion 9 and hold between them the disc 7 which is provided with a central hole of the same diameter as that of the stepped portion 9. A locking sleeve 13 is screwed onto a threaded part of the stepped portion 9 and secures the spacing rings 11 and 12, and thus the disc 7, against the flange 8. The face of the locking sleeve 13 nearer the disc 7 is relieved approximately .004" at 10a. Further spacing rings 14 and 15 hold between them the periphery of the disc 7. The spacing ring 15 abuts against an internal face 16 of the carrier 6, while a locking nut 17 holds both the spacing rings 14 and 15, and thus the outer portion of the disc 7, firmly to the carrier 6. The locking nut 17 is locked in position by five conical headed grub crews, only one of which, 18, is shown in FIGURE 2.

Five knives 19 are equally spaced around the knife carrier 6. The knives are of square section and fit into relieved portions 20 of the carrier 6. The knives 19 are held in position by straps 21 which are fixed to the carrier 6 by screws 22 against the action of bowed leaf springs 23, which serve to lift the straps 21 to facilitate turning of the edges.

The shaft 5 is carried in eccentrically mounted bearings 24 and 25. By rotating these bearings 24 and 25 together in their mountings the distance between the axis of the shaft 5 and the axis of fixed shaft 26 carrying the cylinder 1 can be varied. Similarly by rotating one bearing only, the knives 19 can be set up so as to be parallel to the surface of the cylinder 1.

In operation, the knives 19 are set up, my manipulating the eccentric bearings 24 and 25, to be parallel with the peripheral surface of the web-carrying cylinder 1 and the distance between the axes of the cylinder 1 and of the shaft 5 is made to be such that the arc of rotation of the knife edges 19 interferes with the cylinder 1. Thus every time a knife 19 comes into contact with the surface of the cylinder 1 the shaft 5 is caused to bend into an arcuate shape between its bearings 24 and 25. The bending may be achieved by spacing apart the bearings or by reducing the shaft diameter. The bending of the shaft 5 supplies the pressure necessary between the knife edge 19 and the cylinder 1 to sever the intervening web W. If a knife 19 is not perfectly aligned with the mating portion of the peripheral surface of the cylinder 1, the knife edge in question and thus the carrier 6 pivots about the disc 7 by causing the disc 7 to deform until it is in alignment. The total pivotal movement is restricted by the spacing rings 14 and 15 which act as stops coming into contact with the relieved portions 10a and 10 respectively of the locking sleeve 13 and the flange 8.

Pressure of the knife 19 against the cylinder 1 can be increased by decreasing the distance between the shafts 5 and 26. Conversely pressure can be reduced by increasing this distance. Thus a desired pressure can be achieved and this adjustment to a desired figure together with the self-aligning properties of the knife edge 19, caused by the flexure of the disc 7, enables a web to be cut with a clean action.

I claim:

1. In a cigarette making machine, web-cutting apparatus comprising a rotatable resilient carrier shaft, a diaphragm secured to said shaft, a carrier secured to said diaphragm, a cutting member having a cutting edge rigidly fixed to said carrier, and a web-carrying drum substantially parallel to said shaft against which said cutting edge presses to cut a web, the spatial relationship of said drum to said carrier being such that said carrier shaft flexes when the said cutting edge presses against said drum, said diaphragm imparting a degree of freedom of rotary movement between said carrier and said carrier shaft about an axis transverse to the axis of said carrier shaft so that said cutting edge is alignable with said drum, and the flexion of said carrier shaft providing a further degree of freedom of movement of said carrier relative to said drum along said axis.

2. Web cutting apparatus as claimed in claim 1, in which the circumference of said diaphragm nearer said carrier shaft is clamped between a flange and locking ring both of which are integral with said carrier shaft.

3. Web cutting apparatus as claimed in claim 2, in which the outer circumference of said diaphragm is clamped between an inner flange of said carrier and a locking sleeve.

4. Web cutting apparatus as claimed in claim 3, in which both circumferences of said diaphragm are in contact with spacing rings.

5. Web cutting apparatus as claimed in claim 4, in which said spacing rings in contact with said outer circumference limit the rotary movement of said carrier about an axis transverse to the axis of said carrier shaft by abutting either said inner flange or said locking sleeve.

6. Web cutting apparatus as claimed in claim 5, in which said carrier shaft is housed in eccentrically mounted bearings so that the distance between the axes of said drum and said carrier shaft is variable by rotating said bearings.

7. A rotatable cutting device, comprising a cutting member having a cutting edge, a rotatable drum in which said cutting member is rigidly mounted, a countersurface against which said cutting member cuts, a shaft about which said drum is rotatable, a diaphragm connecting said drum to said shaft, said diaphragm being capable of flexing so as to permit said drum to rotate about an axis transverse to that of said shaft whereby said cutting edge is aligned with said countersurface, inner and outer pairs of clamping rings for fixing said diaphragm to said drum and said shaft and projections on said shaft against which the outer pair of rings can abut so as to limit rotary movement of said drum about an axis transverse to that of said shaft.

References Cited by the Examiner

UNITED STATES PATENTS

| 601,719 | 4/98 | Taylor | 83—643 X |
| 2,681,107 | 6/54 | Hocutt | 83—348 |
| 2,743,778 | 5/56 | Balsam | 83—348 |
| 3,151,513 | 10/64 | Rowlands | 83—665 X |

FOREIGN PATENTS

| 934,295 | 8/63 | Great Britain. |

WILLIAM W. DYER, JR., *Primary Examiner.*

ANDREW R. JUHASZ, *Examiner.*